(12) United States Patent
Arico et al.

(10) Patent No.: US 7,662,437 B2
(45) Date of Patent: Feb. 16, 2010

(54) TEMPLATE FOR ARRANGING SPACERS ON A PREFORM AND METHOD OF DENSIFYING A PREFORM INCLUDING THE USE OF SPACERS POSITIONED BY A TEMPLATE

(75) Inventors: Alan A. Arico, South Bend, IN (US); David E. Parker, Granger, IN (US); Akshay Waghray, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 707 days.

(21) Appl. No.: 11/384,402

(22) Filed: Mar. 21, 2006

(65) Prior Publication Data

US 2006/0216666 A1   Sep. 28, 2006

Related U.S. Application Data

(60) Provisional application No. 60/664,587, filed on Mar. 24, 2005.

(51) Int. Cl.
*C23C 16/00* (2006.01)
(52) U.S. Cl. .................................. 427/249.2
(58) Field of Classification Search .............. 427/248.1, 427/249.1, 249.2, 900; 118/715, 728
See application file for complete search history.

(56) References Cited

U.S. PATENT DOCUMENTS

| 312,227 A | 2/1885 | Taft |
| 2,610,413 A | 9/1952 | Dasey |
| 3,336,898 A | 8/1967 | Simmons et al. |
| 3,775,133 A | 8/1973 | Greenlay, et al. |
| 4,191,128 A | 3/1980 | Hunt |
| 4,599,069 A | 7/1986 | Murakami et al. |
| 5,256,206 A | 10/1993 | Anthony et al. |
| 5,352,294 A | 10/1994 | White et al. |
| 5,474,612 A | 12/1995 | Sato et al. |
| 5,576,058 A | 11/1996 | Norrgrann et al. |
| 5,679,159 A | 10/1997 | Olson |
| 6,764,272 B1 | 7/2004 | Nuxoll et al. |

*Primary Examiner*—Timothy H Meeks
*Assistant Examiner*—Elizabeth Burkhart
(74) *Attorney, Agent, or Firm*—Birch, Stewart, Kolasch & Birch, LLP.

(57) ABSTRACT

A template (10) configured for use with an annular preform (26) having a periphery (32) and an inner opening (34), the template (10) having an annular body with an outer periphery (16) and an inner opening (18) and a plurality of spacer openings (12) through its body each for receiving a spacer (25), one of the template inner opening (18) and the template outer periphery (16) having a width equal to the width of the preform inner opening (34) or the preform outer periphery (32). Also a method for densifying preforms that includes a step of positioning spacers using a template.

8 Claims, 6 Drawing Sheets

TEMPLATE FOR ARRANGING SPACERS ON A PREFORM AND METHOD OF DENSIFYING A PREFORM INCLUDING THE USE OF SPACERS POSITIONED BY A TEMPLATE

CROSS-REFERENCE TO RELATED APPLICATIONS

The present application claims the benefit of U.S. Provisional Patent Application No. 60/664,587, filed Mar. 24, 2005, the entire contents of which are hereby incorporated by reference.

FIELD OF THE INVENTION

The present direction is directed to a method of densifying preforms and a template for positioning spacers on a preform, and, more specifically, to a method for densifying preforms that includes a step of positioning spacers on a preform using a template and placing an additional preform on the spacers and to a template for positioning the spacers, the template including an inner opening or an outer periphery that is alignable with an inner opening or outer periphery of a preform with which the template is used.

BACKGROUND OF THE INVENTION

Carbon-carbon and/or ceramic matrix composite disks may be used as brake rotors and/or stators in automotive and aircraft brake systems. During the manufacture of these discs, non-woven fiber preforms may be placed in a furnace and subjected to multiple CVI/CVD process cycles. During these processes, multiconstituent hydrocarbons and/or other precursor process gases are deposited in the body of the preforms as pyrocarbon or other ceramic matrices. This processing is referred to as "densification" and results in an increase in the density of the preform with each process cycle. The process will be referred to as CVD. Before the first CVD process cycle, for example, the preforms may have a density of about 0.5 g/cc.

Normally, CVD processes are carried out on multiple composite preforms that have been arranged in stacks in a CVD furnace. The composite preform are generally annular or ring shaped and must be spaced from adjacent preforms to allow gases to flow around and into the preforms. One way of spacing the preforms is to manually place a number of separate spacers on a preform. Typically, about 8 to 12 spacers are used between layers in the stack. If a stack includes 10 preforms, for example, 72 to 84 separate spacers will have to be placed, which is a time-consuming process.

If too few spacers are used or if the spacers are not positioned properly, the spacers may leave indentations in the preforms that must be machined off. In some cases, the indentations are too deep to be removed completely, and preforms with such deep indentations must be discarded. Care must therefore be taken to position the spacers accurately so that the preforms above the spacers are properly supported and the weight of the higher preforms in the stack is evenly distributed across the surface of the lower preforms. It would be desirable to provide a method of densifying preforms that allowed for rapid and accurate placement of spacers.

SUMMARY OF THE INVENTION

These and other problems are addressed by the present invention, which comprises, in a first aspect, a method of densifying a preform that includes providing a plurality of preforms and a plurality of spacers, placing a first one of the plurality of preforms on a support, and placing a template having a plurality of spacer openings on the first one of the plurality of preforms. Spacers are placed in at least some of the plurality of spacer openings in the template on the first one of the plurality of preforms, and the template is removed from the first one of the plurality of preforms while leaving spacers supported by the first one of the plurality of preforms. A second one of the plurality of preforms is placed on the spacers supported by the first one of the plurality of preforms, the preforms and spacers are placed in a furnace, and heat and process gases are supplied to the furnace.

Another aspect of the invention comprises a template configured for use with an annular preform having a periphery and an inner opening. The template comprises an annular body having an outer periphery and an inner opening and a plurality of spacer openings through its body, each for receiving a spacer. One of the template inner opening and the template outer periphery has a width equal to the width of the preform inner opening or the preform outer periphery.

A further aspect of the invention comprises a template configured for use with a first set of annular preforms having a first width and an inner opening having a second width and with a second set of annular preforms having a third width greater than said first width and an inner opening having a fourth width greater than said second width. The template has an annular body with an outer periphery having a fifth width and an inner opening having a sixth width and a plurality of spacer openings through said body, each for receiving a spacer. The template fifth width is approximately equal to the third width and the template sixth width is approximately equal to the second width. This allows the template to be alignable with either the first or second preform.

BRIEF DESCRIPTION OF THE DRAWINGS

These aspects of the invention and others will be better appreciated from a reading of the below detailed description together with the following drawings wherein.

DETAILED DESCRIPTION

Figure 1:
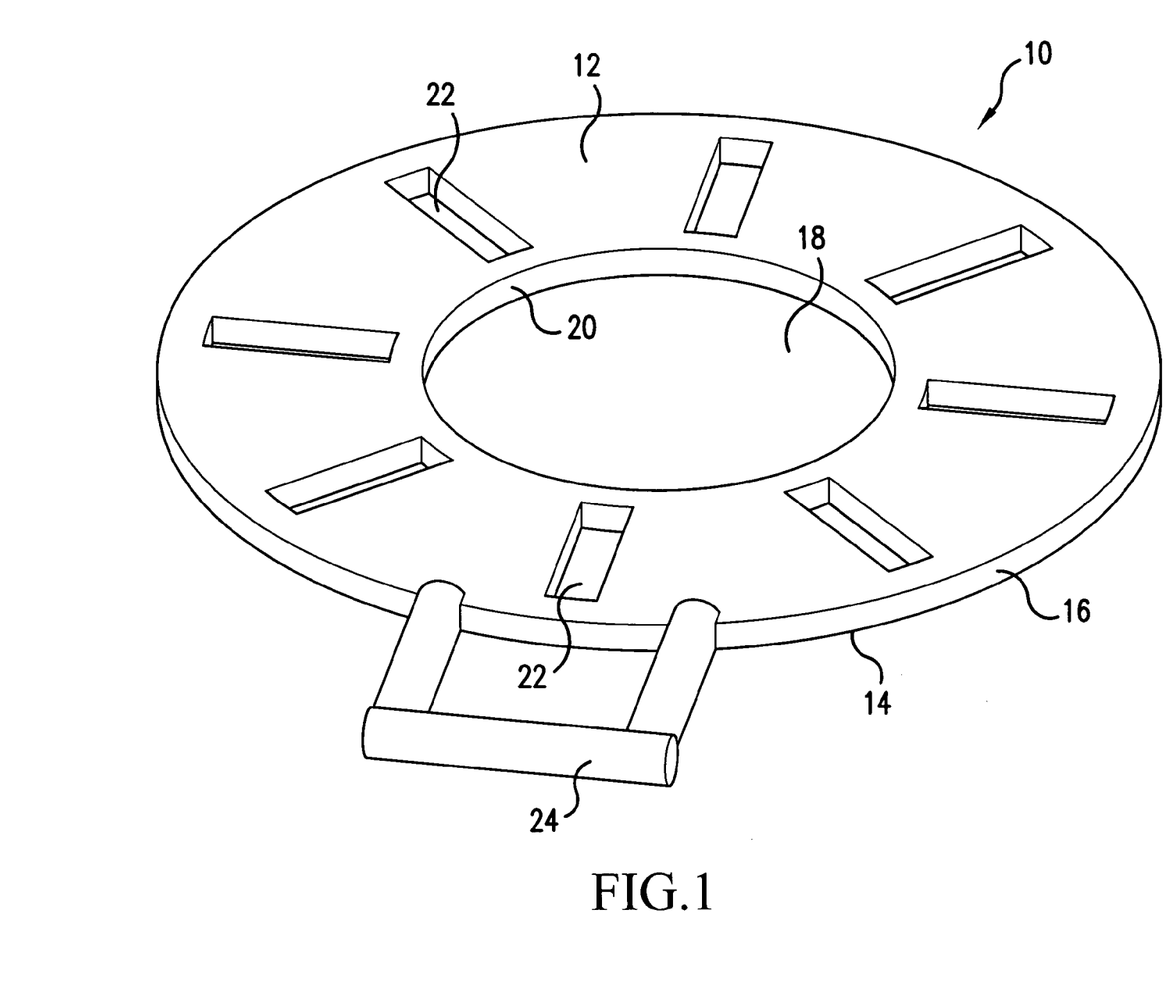
FIG. 1 is a perspective view of a template according to an embodiment of the present invention.

Referring now to the drawings, wherein the showings are for purposes of illustrating preferred embodiments of the invention only and not for the purpose of limiting same, FIG. 1 illustrates a template 10 having a top side 12, a bottom side 14, an outer wall 16 and a central opening 18 defined by an inner wall 20. A plurality of spacer openings 22 extend between top side 12 and bottom side 14, and a handle 24 is connected to top side 12 and outer wall 16. Openings 22 are sized and shaped to receive at least one of a plurality of spacers such as spacers 25 illustrated in FIG. 3.

In the present embodiment, template 10 includes eight openings 22; however a greater or lesser number of openings may be provided, depending on the application to which the template 10 is put. Furthermore, some openings are omitted from some drawing figures to improve clarity. The spacer openings 22 are evenly spaced in this embodiment to help ensure that each spacer 25 supports an equal amount of weight. Furthermore, the openings 22 are radially aligned so that the spacers 25 will be radially aligned when placed on a preform using template 10. This positioning may be desirable for reducing interference with gas flow from the inside to the outside of the stack of preforms. The shapes, sizes, and relative positions of the openings 22 will depend on the preforms being used and the process being performed. The template can be formed from any suitable material, and is preferably formed from a material that is durable and relatively light weight. A thin sheet of steel, for example, could be used. However, the template will not be subjected to extreme conditions, and therefore other materials, such as common plastics, could also be used.

Figure 2:
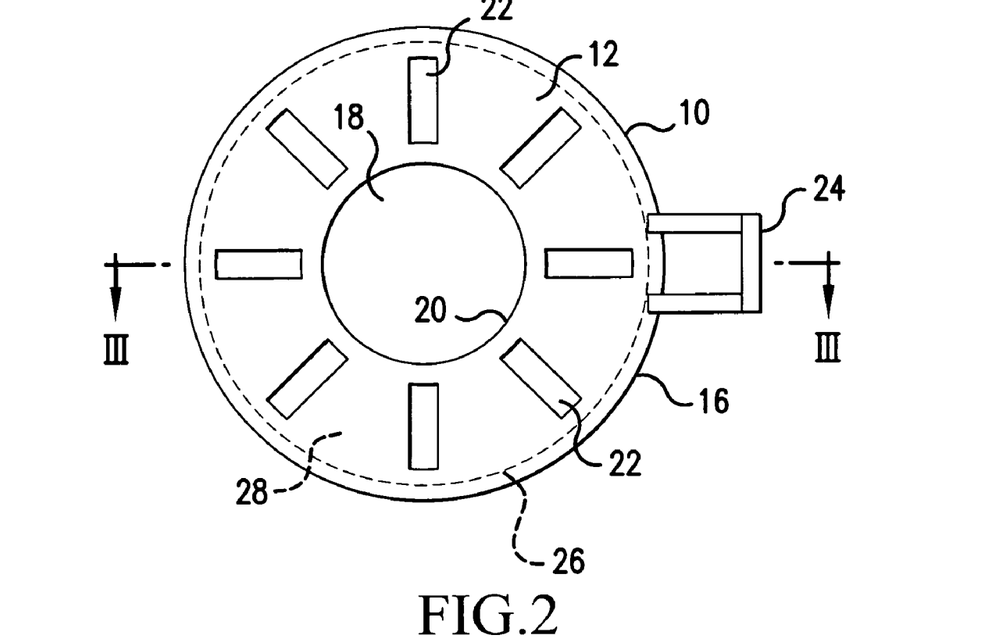
FIG. 2 is a top plan view of the template of FIG. 1 resting on a first preform.
Figure 3:
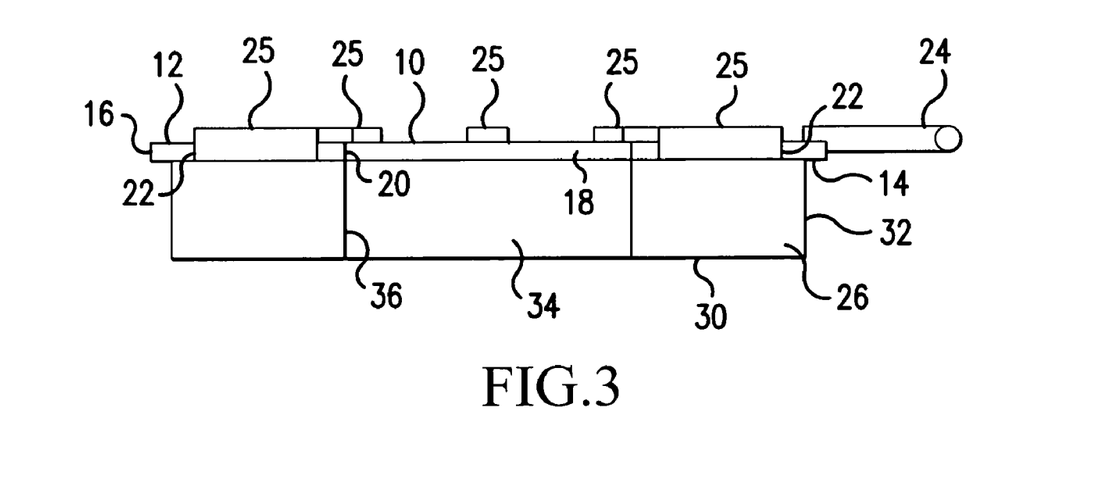
FIG. 3 is a sectional elevation view of the template and preform of FIG. 2 taken along line III-III of FIG. 2 with a plurality of spacers fitted into spacer openings in the template.
Figure 4:
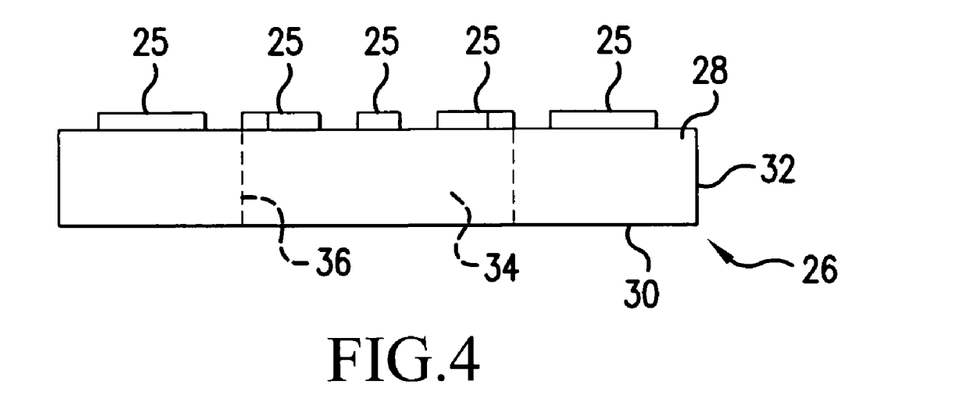
FIG. 4 is a side elevational view of the preform and spacers of FIG. 3 with the template removed.

Template 10 is sized for use with two different preforms. A first preform 26 is illustrated in FIGS. 2 and 3. Preform 26 includes a top side 28, a bottom side 30, an outer wall 32 and an central opening 34 defined by an inner wall 36. As will be appreciated from FIGS. 2 and 3, the central opening 18 of the template 10 is about the same width as the central opening 34 of the preform. Template 10 is properly positioned on preform 26 when the template central opening 18 is aligned with the preform central opening 34. The width of template 10 is slightly greater than the width of preform 26. FIG. 4 illustrates the position of several spacers 25 on the top side 28 of preform 26 after template 10 is removed.

Figure 5:
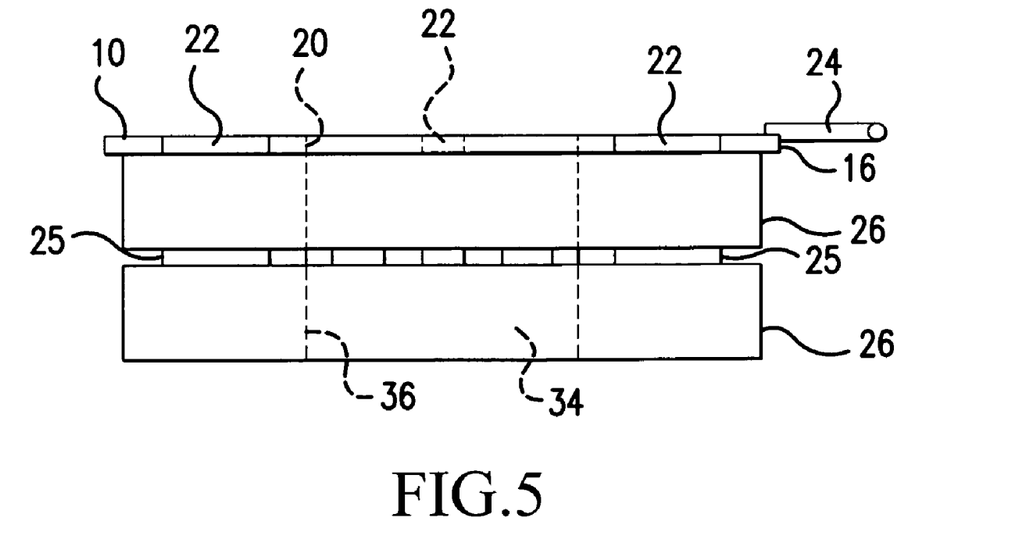
FIG. 5 is a side elevational view of the preform and spacers of FIG. 4 with a second preform supported by the spacers and the template of FIG. 1 supported by the second preform.

FIG. 5 illustrates a second preform 26 placed on top of spacers 25 and template 10 supported by the top side 28 of the second preform 26. Note that the position of handle 24 helps a user align the spacers between a first pair of preforms with the spacers between a second pair of spacers if this is considered desirable; alternately, the position of the handle can be shifted with each layer of preforms to help ensure that the spacers in different levels are not mutually aligned. For ease of handling larger size preforms, the template may include a second handle, not shown.

Figure 6:
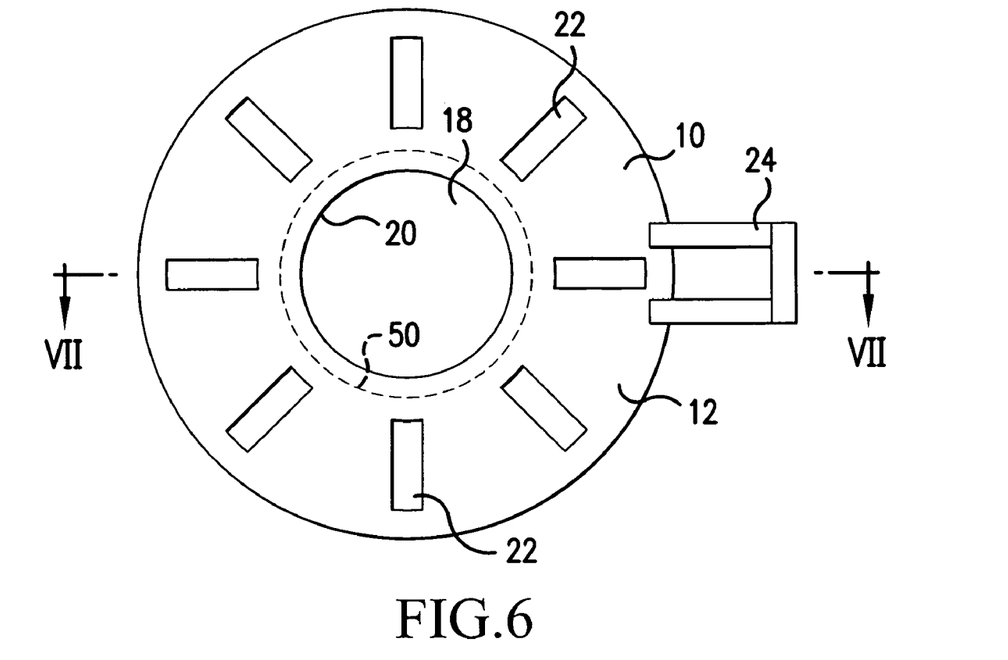
FIG. 6 is a top plan view of the template of FIG. 1 resting on an alternate preform having larger inner and outer diameters than the preform of FIG. 2.
Figure 7:
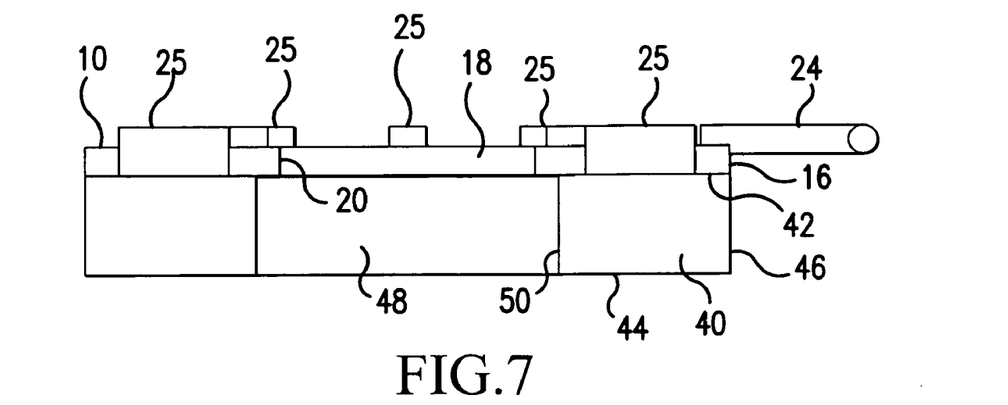
FIG. 7 is a sectional elevational view of the preform and template of FIG. 6, taken along line VII-VII, with a plurality of spacers fitted into spacer openings in the template.

FIGS. 6 and 7 illustrate the template 10 described above used in connection with a second preform 40. Second preform 40 includes a top side 42, a bottom side 44, an outer wall 46 and a central opening 48 defined by an inner wall 50. The diameter of central opening 48 of second preform 40 is greater than the diameter of the central opening 34 of preform 26. However, the outer diameter of preform 40 is about the same as the outer diameter of template 10. Therefore, when template 10 is used with second spacers 40, the template 10 can be readily aligned with the preform 40 by aligning the outer wall 16 of the template with the outer wall 46 of the second preform 40.

Figure 8:
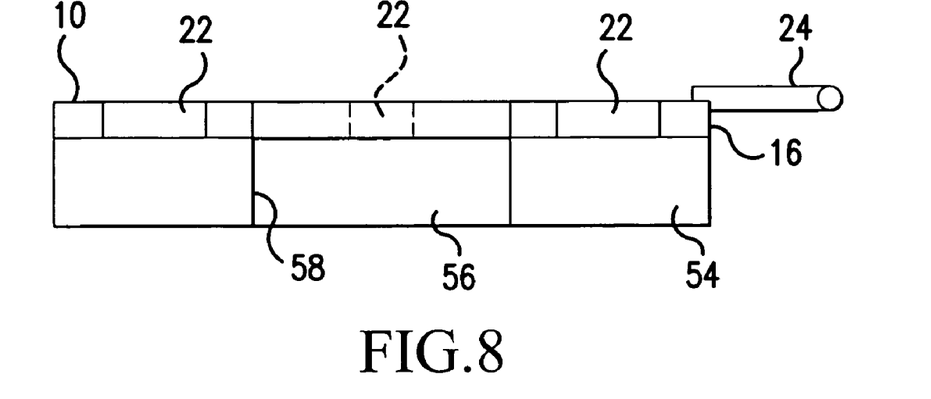
FIG. 8 is a sectional view of an second embodiment of a template that has an inner diameter and outer diameter equal to the inner and outer diameters of the preform with which it is used.

FIG. 8 illustrates template 10 being used with a third preform 54 which has a central opening 56 with about the same diameter as template central opening 18 and an outer width about the same as the outer width of template 10. Template 10 can therefore readily be used with any preform that has at least one of an outer diameter or an inner opening diameter that is the same as the outer diameter or inner opening diameter of the template. Of course, it is not always necessary for the inner opening or the outer circumference of the template to line up with an opening or diameter of the preform; however, when the template is sized for use with particular preforms as discussed above, consistent alignment can be quickly obtained.

Figure 9:
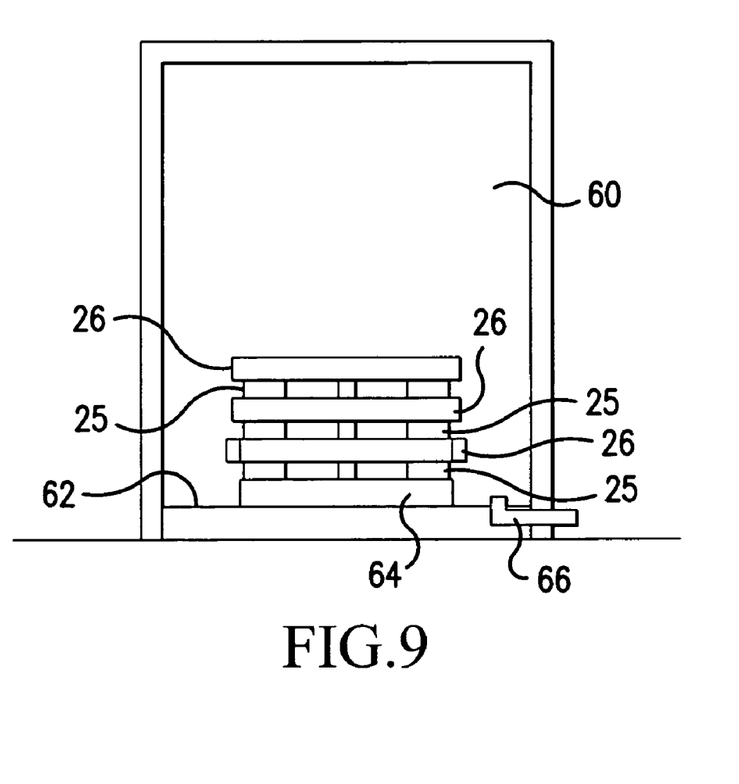
FIG. 9 schematically illustrates a stack of preforms and spacers arranged in a furnace.

FIG. 9 illustrates a furnace 60 having a floor 62 which includes a support 64 on which a plurality of spacers 25 are arranged. These spacers may be positioned using template 10. A first preform 26 is placed on these spacers 25. A plurality of spacers 25 are positioned on top side 28 of preform 26, and a second preform 26 is placed on spacers 25. Additional layers of spacers and preforms are stacked in a similar manner. Process gases are introduced into the furnace through pipe 66. The stack of preforms will generally be formed outside the furnace 60 and moved into the furnace 60 for processing. However, it also may be possible to stack the preforms and spacers in the furnace 60 itself.

Figure 10:
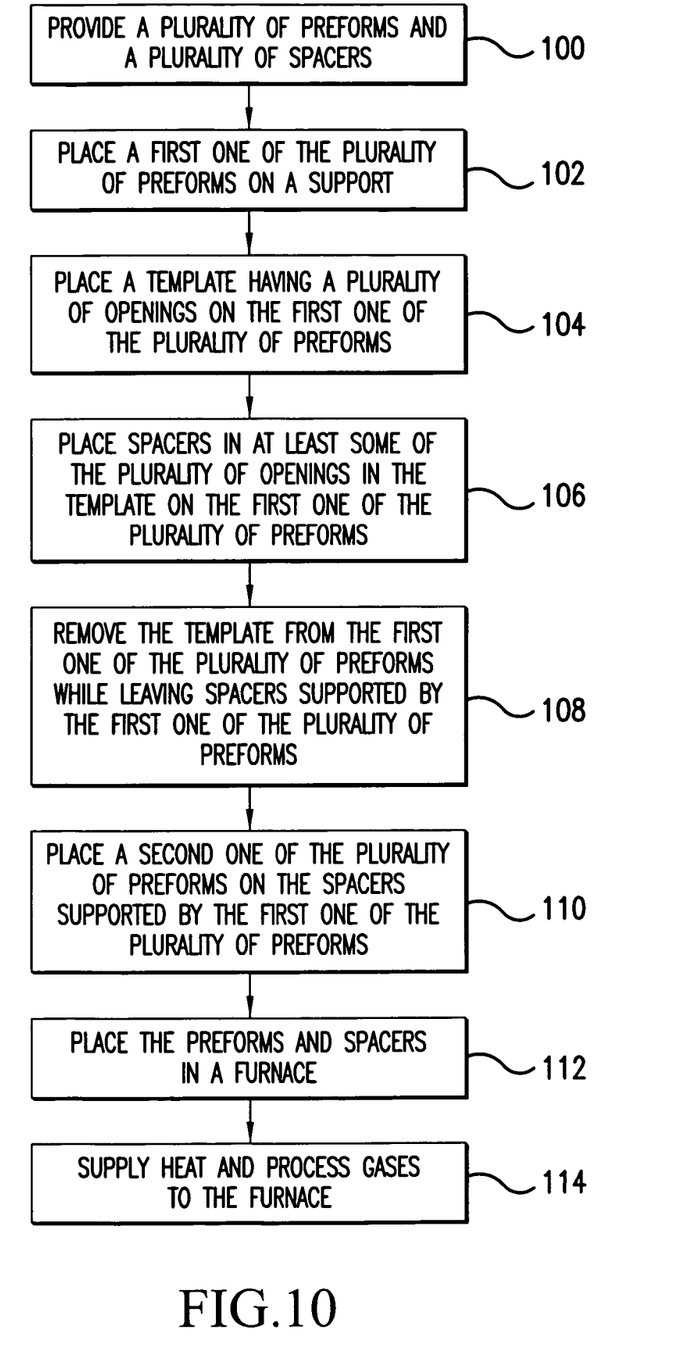
FIG. 10 is a flow chart illustrating a method according to an embodiment of the present invention.

FIG. 10 illustrates a method of densifying preforms using a template according to an embodiment of the present invention which includes a step 100 of providing a plurality of preforms and a plurality of spacers, a step 102 of placing a first one of the plurality of preforms on a support, a step 104 of placing a template having a plurality of openings on the first one of the plurality of preforms, and a step 106 of placing spacers in at least some of the plurality of openings in the template on the first one of the plurality of preforms. The template is removed from the first one of the plurality of preforms at a step 108 while leaving spacers supported by the first one of the plurality of preforms and, at a step 110, a second one of the plurality of preforms is placed on the spacers supported by the first one of the plurality of preforms. The preforms and spacers are placed in a furnace at a step 112, and heat and process gases are supplied to the furnace at a step 114.

The present invention has been described herein in terms of preferred embodiments. However, obvious modifications and additions to these embodiments will become apparent to those of ordinary skill in the art upon a reading of the foregoing description. It is intended that all such obvious modifications and additions form a part of the present invention to the extent that they fall within the scope of the several claims appended hereto.

What is claimed is:

1. A method of densifying a preform comprising the steps of:

providing a plurality of preforms and a plurality of spacers;

placing a first one of the plurality of preforms on a support;

placing a template having a plurality of spacer openings on the first one of the plurality of preforms;

placing spacers in at least some of the plurality of spacer openings in the template on the first one of the plurality of preforms;

removing the template from the first one of the plurality of preforms while leaving spacers supported by the first one of the plurality of preforms;

placing a second one of the plurality of preforms on the spacers supported by the first one of the plurality of preforms;

placing the preforms and spacers in a furnace; and supplying heat and process gases to the furnace.

2. The method of claim 1, wherein the preforms have an outer periphery and an inner opening and the template has an outer periphery and an inner opening, and including the additional step of aligning the template inner opening with the preform inner opening.

3. The method of claim 2, including the additional step of aligning the template periphery with the preform periphery.

4. The method of claim 1, wherein the preforms have an outer periphery and an inner opening and the template has an outer periphery and an inner opening, and including the additional step of aligning the template periphery with the preform periphery.

5. The method of claim 1 including the additional steps of:

placing the template on the second one of the plurality of preforms;

placing spacers in at least some of the spacer openings in the template on the second one of the plurality of preforms; and placing a third one of the plurality of preforms onto the spacers supported by the second one of the plurality of preforms.

6. The method of claim 5 wherein said step of placing the template on the first one of the plurality of preforms includes the step of placing the template in a first circumferential orientation with respect to the first one of the plurality of preforms and wherein said step of placing the template on the second one of the plurality of preforms includes the step of placing the template in the first circumferential orientation.

7. The method of claim 5 wherein said step of placing spacers in at least some of the plurality of spacer openings in the template on the first one of the plurality of preforms comprises the step of placing spacers in all the spacer openings in the template on the first one of the plurality of preforms.

8. The method of claim 1 wherein the plurality of spacer openings have the same shape as a cross section of the spacers and including the additional step of aligning the spacers with spacer openings in the template before placing the spacers into the spacer openings.

* * * * *

UNITED STATES PATENT AND TRADEMARK OFFICE
CERTIFICATE OF CORRECTION

PATENT NO. : 7,662,437 B2 Page 1 of 1
APPLICATION NO. : 11/384402
DATED : February 16, 2010
INVENTOR(S) : Arico et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this

Thirtieth Day of November, 2010

David J. Kappos
*Director of the United States Patent and Trademark Office*